Patented May 30, 1950

2,509,513

UNITED STATES PATENT OFFICE 2,509,513

SYNTHETIC RUBBERLIKE MATERIALS

William C. Mast, Philadelphia, and Charles H. Fisher, Abington, Pa., assignors to United States of America as represented by the Secretary of Agriculture No Drawing. Application May 25, 1945, Serial No. 595,868

6 Claims. (Cl. 260—89.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to synthetic rubberlike materials, and particularly to synthetic rubbers prepared from resins consisting of polymerized alkyl acrylates.

It is known that such resins, as for example, the polymers and copolymers of alkyl acrylates like methyl acrylate, ethyl acrylate and other normal alkyl acrylates are soft and flexible. Furthermore, it is known that useful flexible materials can be made by blending these resins with other materials or by incorporating fillers and pigments therein. The resulting products, however, lack some of the desirable characteristics found in rubber and certain synthetic rubbers, and several unsuccessful attempts have been made to transform the flexible resins into true synthetic rubbers. Vulcanization does not occur when resins, such as polymethyl acrylate and polyethyl acrylate, are heated with sulfur. We have attempted vulcanization by heating such resins containing sulfur, and mixtures of these resins, with sulfur, carbon black and some of the standard accelerators used with rubber, without successful results. No appreciable change is brought about by heating such mixtures, and the products lack many of the desirable properties found in vulcanized rubber and vulcanized synthetic rubbers.

The prime object of the invention is to provide methods for vulcanizing or cross-linking these resins.

Another object of this invention is to produce vulcanizates of these resins which have enhanced rubberlike properties and are capable of being used in place of rubber.

A further object is to prepare such resins which can be compounded and milled on standard rubber rolls and equipment and cured or vulcanized in standard rubber molds to give vulcanized rubberlike products.

A further object is to produce synthetic rubbers which have greater resistance to light, oils, oxidation, aging, and heat than natural rubber and some of the previously described synthetic rubbers.

A further object is to provide synthetic rubbers which can be made from carbohydrates, an abundant and reproducible raw material.

Other objects and advantages of the invention will appear hereinafter.

We have found that certain resins consisting of polymerized alkyl acrylates such as methyl acrylate, other alkyl acrylates, and mixtures thereof, polymerized either with or without polymerization regulators such as acrylonitrile, carbon tetrachloride, hexachloroethane, alkyl xanthogen disulfide, and so forth, may be compounded with a vulcanizing agent comprising a quinone derivative selected from the class consisting of quinone dioxime and its esters, such as quinone dioxime dibenzoate, together with a lead oxide selected from the class consisting of red lead and litharge, the lead oxide being employed in the proportion of about 10 parts per 100 parts of the resin. Other quinone derivatives, such as dichloroquinone chloroimide, may also be used. The mixture of the resin and the vulcanizing agent may be further compounded with other suitable agents commonly used in the natural and synthetic rubber industries, such as a vulcanization accelerator, as, for example, mercaptobenzothiazole, tetramethylthiuram disulfide, and so forth, an accelerator activator, such as stearic acid, and a reinforcing agent, such as carbon black, iron oxide, zinc oxide, titanium dioxide, aluminum oxide, calcium sulfate, and so forth, and the compounded mixture heated under the general conditions commonly used to vulcanize rubber and other synthetic rubbers.

In the following tabulated examples, emulsion polymerization, as described in the following paragraph, was used as a matter of convenience to prepare the resins (polymerized alkyl acrylates), but they can be made by solution and mass polymerization.

The polymerizations were carried out in round-bottomed, three-necked, Pyrex-glass flasks fitted with a thermometer well reflux condenser, and a water-sealed stirrer (ground-glass joints). The stirrers were of the paddle, anchor, or half-moon type and were rotated at 75 to 150 R. P. M. The monomer mixture comprising the alkyl acrylates, used with and without acrylonitrile, was added to water and an emulsifying agent in the flask, stirred, and heated to approximately refluxing temperature. The desired amount of catalyst was then added, either all at once or in several portions. Heating was applied if necessary to maintain gentle refluxing, and the course of the polymerization was followed by noting changes in the refluxing temperature. When refluxing ceased in spite of heating (usually about 92° C.), the polymerization was finished. The emulsion was then poured into a beaker and coagulated by the addition of a dilute solution of sodium chloride, washed with water, and dried.

Further details of the polymerizations are shown in Table I, the vulcanization data on the resulting resins being shown in Table II.

TABLE I
*Preparation of resins*

| Example No. | Monomers | | Alkyl Sodium Sulfate (emulsifier) | Ammonium Persulfate (catalyst) | Water | Polymerization | | |
|---|---|---|---|---|---|---|---|---|
| | Ethyl Acrylate | Acrylonitrile | | | | Temp. | Time | Yield of Polymer |
| | Grams | Grams | Grams | Grams | Ml. | °C. | Hours | Per cent |
| 1 | 142.5 g | 7.5 | 4 | 0.02 | 250 | 78–92 | 4.25 | 88.5 |
| 2 | 150.0 ml | 0.0 | 4 | 0.025 | 300 | 80–92 | 1.5 | 87.5 |
| 3 | 142.5 g | 7.5 | 4 | 0.045 | 300 | 78–91 | 4.5 | 90.5 |
| 4 | 760.0 g | 0.0 | 50 | 0.500 | 2000 | 67–91 | 12.0 | 100.0 |

TABLE II
*Vulcanization of the resins of Table I*

| Example No. | Compounding ingredients in parts per 100 parts of polymer | | | | | Vulcanization | | Tensile Strength | Ultimate Elongation | Shore A Hardness |
|---|---|---|---|---|---|---|---|---|---|---|
| | Red lead | Zinc oxide | Stearic acid | Quinone dioxime | Carbon black | Time | Temp. | | | |
| | | | | | | Min. | °F. | Lb./sq. in. | Per cent | |
| 1 | 10 | 5 | 3 | 2 | 30 | 240 | 298 | 1320 | 260 | 72 |
| 2 | 10 | 5 | 3 | 2 | 30 | 240 | 298 | 1390 | 510 | 55 |
| 3 | 10 | 5 | 3 | 2 | 30 | 240 | 298 | 1420 | 340 | 70 |
| 4 | 10 | 5 | 3 | 2 | 30 | 240 | 298 | 1400 | 470 | 53 |

The resin prepared in Example 1 was vulcanized by comprising 100 parts of the resin with 0.5 mercaptobenzothiazole; 10, ZnO; 2, stearic acid; 2, sulfur; 30, carbon black; and 1, tetramethylthiuramdisulfide, followed by heating in a mold for 4 hrs. at 298° F.; tensile strength and breaking elongation, respectively, were 830 p. s. i. and 1040%.

The practice of our invention is not limited to the agents shown in Table I and Table II. For example, many emulsifiers may be used instead of alkyl sodium sulfate, and various peroxides and percompounds may be used to initiate the polymerization.

The compounding ingredients, listed in Table II, were milled into the resins on a standard rubber mill which had steam-heated rolls. The resins were tacky and required little or no breakdown before forming a rolling bank. Large amounts of carbon black could be milled into the resins. The compounded mixtures were cured and tested with equipment and techniques used in the rubber and synthetic rubber industries. The vulcanized products were soft, flexible, elastic and rubberlike in appearance and feel, were insoluble in hydrocarbon solvents and in water, and were resistant to oxygen, aging and heat.

This invention is a valuable advance in the art as it extends the range of known rubber substitutes, giving new substitutes for rubber which have in some respects advantages over rubber. Furthermore, the synthetic rubbers described herein can be made almost entirely, through lactic acid as intermediate, from carbohydrates, an abundant, domestic and reproducible raw material.

The resins (polymerized alkyl acrylates) prepared in the present invention are saturated, whereas other resins prepared by copolymerizing acrylic esters and monomers such as butadiene, are unsaturated, it being previously considered that unsaturation was essential for vulcanization. It is advantageous, however, to omit the unsaturated monomers because it is difficult to prevent cross-linkage when such type monomers is employed.

Having thus described our invention, what is claimed is:

1. A process comprising compounding a resin consisting of polymerized alkyl acrylate with a vulcanizing agent comprising a quinone derivative selected from the class consisting of quinone dioxime and its esters together with a lead oxide selected from the class consisting of red lead and litharge, said lead oxide being present in the proportion of about 10 parts per 100 parts of said resin, and heating the compounded mixture until vulcanization is effected.

2. A process comprising compounding a resin consisting of polymerized alkyl acrylate with a vulcanizing agent comprising quinone dioxime together with red lead, said red lead being present in the proportion of about 10 parts per 100 parts of said resin, and heating the compounded mixture until vulcanization is effected.

3. A process comprising compounding a resin consisting of polymerized alkyl acrylate with a vulcanizing agent comprising a quinone derivative selected from the class consisting of quinone dioxime and its esters together with a lead oxide selected from the class consisting of red lead and litharge, said lead oxide being present in the proportion of about 10 parts per 100 parts of said resin, and with a reinforcing agent, and heating the compounded mixture until vulcanization is effected.

4. A process comprising compounding a resin consisting of polymerized alkyl acrylate with a vulcanizing agent comprising a quinone derivative selected from the class consisting of quinone dioxime and its esters together with a lead oxide selected from the class consisting of red lead and litharge, said lead oxide being present in the proportion of about 10 parts per 100 parts of said resin, with a reinforcing agent, with a vulcanization accelerator, and with an accelerator activator, and heating the compounded mixture until vulcanization is effected.

5. A rubberlike material comprising a vulcanized mixture of a resin consisting of polymerized alkyl acrylate and a vulcanizing agent comprising a quinone derivative selected from the class consisting of quinone dioxime and its esters together with a lead oxide selected from the class consisting of red lead and litharge, said lead oxide being present in said vulcanized mixture in the proportion of about 10 parts per 100 parts of said resin.

6. A rubberlike material comprising a vulcanized mixture of a resin consisting of polymerized alkyl acrylate and a vulcanizing agent comprising quinone dioxime together with red lead, said red lead being present in said vulcanized mixture in the proportion of about 10 parts per 100 parts of said resin.

WILLIAM C. MAST.
CHARLES H. FISHER.

REFERENCES CITED

The following references are of record in the file of this patent:

UNITED STATES PATENTS

| Number | Name | Date |
|---|---|---|
| 1,121,134 | Rohm | Dec. 15, 1914 |
| 2,105,361 | Nowak | Jan. 11, 1938 |
| 2,170,191 | Fisher | Aug. 22, 1939 |
| 2,393,321 | Haworth | Jan. 22, 1946 |
| 2,414,803 | D'Alelio | Jan. 28, 1947 |
| 2,451,177 | Semegen | Oct. 12, 1948 |
| 2,462,678 | Roedel | Feb. 22, 1949 |

OTHER REFERENCES

India Rubber World, vol. 110, page 74, April 1944.

Ind. and Eng. Chem., vol. 36, pages 1022–1031, Nov. 1944.